United States Patent
Yamaoka

(10) Patent No.: US 12,542,750 B2
(45) Date of Patent: Feb. 3, 2026

(54) COMMUNICATION CONTROL DEVICE, COMMUNICATION CONTROL METHOD, AND STORAGE MEDIUM FOR COMMUNICATION CONTROL

(71) Applicant: DENSO CORPORATION, Kariya (JP)

(72) Inventor: Kousuke Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 410 days.

(21) Appl. No.: 18/171,998

(22) Filed: Feb. 21, 2023

(65) Prior Publication Data
US 2023/0209409 A1 Jun. 29, 2023

Related U.S. Application Data

(63) Continuation of application No. PCT/JP2021/034914, filed on Sep. 23, 2021.

(30) Foreign Application Priority Data

Sep. 29, 2020 (JP) .................. 2020-163786

(51) Int. Cl.
*H04L 47/83* (2022.01)
*H04W 28/20* (2009.01)

(52) U.S. Cl.
CPC ............ *H04L 47/83* (2022.05); *H04W 28/20* (2013.01)

(58) Field of Classification Search
None
See application file for complete search history.

(56) References Cited

U.S. PATENT DOCUMENTS

| 6,590,865 | B1 | 7/2003 | Ibaraki et al. |
| 9,084,276 | B2 * | 7/2015 | Grabowsky ........ H04B 7/18504 |
| 10,069,755 | B1 * | 9/2018 | Sayers ................. H04L 47/805 |
| 10,885,793 | B2 * | 1/2021 | Ouyang ................ H04L 67/12 |

(Continued)

FOREIGN PATENT DOCUMENTS

| JP | 2000115198 A | 4/2000 |
| JP | 2010198260 A | 9/2010 |
| WO | WO-2019065676 A1 | 4/2019 |

OTHER PUBLICATIONS

U.S. Appl. No. 18/172,104, filed Feb. 21, 2023, Yamaoka et al.

*Primary Examiner* — Hassan A Phillips
*Assistant Examiner* — Gautam Sharma
(74) *Attorney, Agent, or Firm* — Harness, Dickey & Pierce, P.L.C.

(57) ABSTRACT

A communication ECU corresponding to a communication control device controls communication between a vehicle and an outside thereof. The communication ECU includes a requested bandwidth calculation unit corresponding to a calculation unit that calculates a requested bandwidth, which is a communication bandwidth requested for execution of a specific process in the vehicle, based on at least one of a computing power and a sensing capability of the vehicle. The communication ECU includes a bandwidth request unit corresponding to a request unit that requests a communication management device to secure the requested bandwidth; and a cooperation condition notification unit corresponding to a defining unit that defines a utilization bandwidth, which is a communication bandwidth used by the vehicle, based on a response to a request to secure the requested bandwidth.

6 Claims, 7 Drawing Sheets

(56) References Cited

U.S. PATENT DOCUMENTS

| | | | |
|---|---|---|---|
| 10,979,509 B2* | 4/2021 | Ma | H04W 72/1268 |
| 12,045,064 B2* | 7/2024 | Baik | G01C 21/3878 |
| 12,196,028 B2* | 1/2025 | Sieg | E05F 15/73 |
| 2009/0154407 A1* | 6/2009 | Jeong | H04W 48/08 |
| | | | 370/329 |
| 2011/0065469 A1* | 3/2011 | Grabowsky | H04W 72/0446 |
| | | | 455/509 |
| 2018/0136651 A1* | 5/2018 | Levinson | G05D 1/0027 |
| 2019/0232898 A1* | 8/2019 | Hu | H04Q 9/02 |
| 2020/0221349 A1 | 7/2020 | Nakata | |
| 2021/0089026 A1* | 3/2021 | Bender | H04W 72/542 |
| 2025/0076456 A1* | 3/2025 | Kim | G01S 13/87 |

* cited by examiner

| SENSOR | | NIGHT | FAR SIDE | BACK-LIGHT | BAD WEATHER | LATERAL DIRECTION | SMALL OBJ/LOW REFLECTION OBJ | DISTANCE MEASURE-MENT |
|---|---|---|---|---|---|---|---|---|
| CAMERA | SINGLE | × | △ | × | × | * | ○ | △ |
| | STEREO | × | △ | × | × | × | ○ | ○ |
| | WIDE ANGLE | × | × | × | × | ○ | ○ | × |
| | TELE | × | ○ | × | × | × | ○ | × |
| MILLIMETER-WAVE | | ○ | △ | ○ | ○ | * | × | ○ |
| 3D LiDAR | | ○ | ○ | ○ | × | ○ | ○ | ○ |
| ULTRASOUND (NEARBY FIELD) | | ○ | × | ○ | ○ | ○ | ○ | ○ |

COMMUNICATION CONTROL DEVICE, COMMUNICATION CONTROL METHOD, AND STORAGE MEDIUM FOR COMMUNICATION CONTROL

CROSS REFERENCE TO RELATED APPLICATION

The present application is a continuation application of International Patent Application No. PCT/JP2021/034914 filed on Sep. 23, 2021, which designated the U.S. and claims the benefit of priority from Japanese Patent Application No. 2020-163786 filed in Japan on Sep. 29, 2020. The entire disclosures of all of the above applications are incorporated herein by reference.

TECHNICAL FIELD

The present disclosure relates to a technique for controlling communication between a vehicle and an outside thereof.

BACKGROUND

A system may limit safe-driving support service targets to specific areas having a high traffic accident rate. When the system detects a vehicle entering a specific area, it uploads information of such vehicle regarding a position, a speed, and a direction, so as to enable an information exchange between vehicles with potentially colliding. With this, it is possible to limit the number of vehicles, which are allowed to use communication bandwidth.

However, the amount of data transmitted and received by vehicles tends to increase in recent years. If simply limiting the communication area, it may cause congestion of the communication when there are many vehicles performing wireless communication in the relevant area, or when the amount of data to be transmitted and received is large.

SUMMARY

The present disclosure provides a communication control device, a communication control method, and a non-transitory, tangible storage medium storing a communication control program including instructions to be executed by a processor.

According to an aspect of the present disclosure, a requested bandwidth, which is a communication bandwidth requested for execution of a specific process in the vehicle, is calculated based on at least one of a computing power and a sensing capability of the vehicle. The communication management device is requested to secure the requested bandwidth, and a utilization bandwidth, which is a communication bandwidth used by the vehicle, is defined based on a response to a request to secure the requested bandwidth.

DESCRIPTION OF EMBODIMENTS

Figure 1:
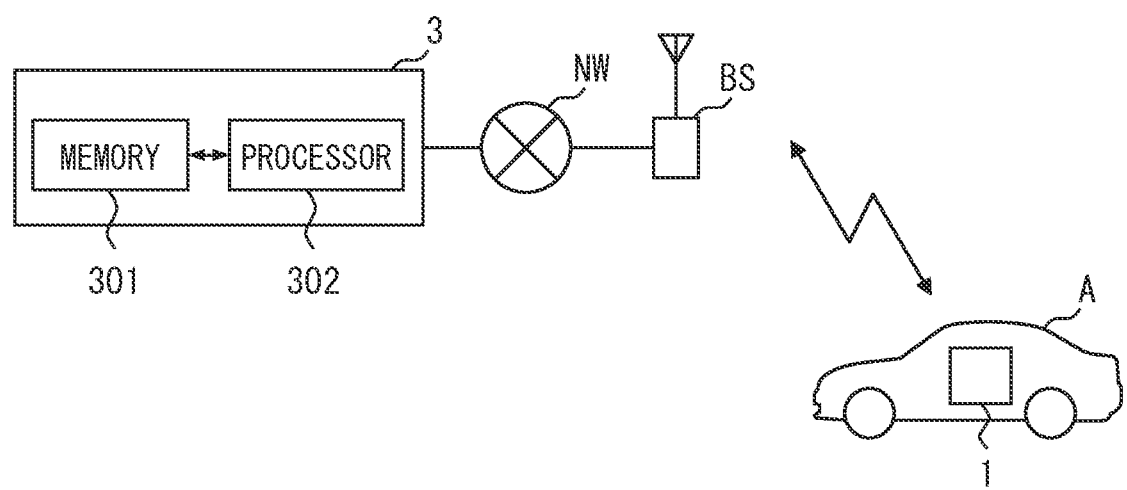
FIG. 1 is a diagram showing a vehicle system and a center server.

It is an object of the present disclosure to provide a communication control device, a communication control method, and a non-transitory, tangible storage medium for storing a communication control program capable of suppressing congestion.

One of the disclosed communication control devices is a communication control device that controls communication between a vehicle and an outside of the vehicle, and may include: a calculation unit that calculates a requested bandwidth, which is a communication bandwidth requested for execution of a specific process in the vehicle, based on at least one of a computing power and a sensing capability of the vehicle; a request unit that requests the communication management device to secure the requested bandwidth; and a defining unit that defines a utilization bandwidth, which is a communication bandwidth used by the vehicle, based on a response to a request to secure the requested bandwidth.

One of the disclosed communication control methods is a communication control method performed by a processor to control communication between a vehicle and an outside of the vehicle, and may include: a calculation process for calculating a requested bandwidth, which is a communication bandwidth requested for execution of a specific process in the vehicle, based on at least one of a computing power and a sensing capability of the vehicle; a request process for requesting a communication management device to secure a requested bandwidth; and a defining process for defining a utilization bandwidth, which is a communication bandwidth used by the vehicle, based on a response to a request to secure the requested bandwidth.

One of the disclosed communication control programs is a communication control program stored in a storage medium and including instructions to be executed by a processor to control communication between a vehicle and an outside of the vehicle. The instructions may include: a calculation process for calculating a requested bandwidth, which is a communication bandwidth requested for execution of a specific process in the vehicle, based on at least one of a computing power and a sensing capability of the vehicle; a request process for requesting a communication management device to secure a requested bandwidth; and a defining process for defining a utilization bandwidth, which is a communication bandwidth used by the vehicle, based on a response to a request to secure the requested bandwidth.

According to these disclosures, the requested bandwidth, which is the communication bandwidth requested for execution of a specific process in the vehicle, is calculated based on at least one of the computing power and the sensing capability of the vehicle, and securing of the requested bandwidth is requested to the communication management device. Then, based on the response to the request to secure the requested bandwidth, a utilization bandwidth, which is the communication bandwidth used by the vehicle, is defined.

Thus, according to the capability of each of the vehicles, the utilization bandwidth can be appropriately allocated. Therefore, it is possible to provide the communication control device, the communication control method, and the communication control program capable of suppressing congestion in communication between the vehicle and the outside thereof.

The calculation unit may be configured to calculate at least two types of requested bandwidth including a required bandwidth required for execution of a specific process in the vehicle and a desired bandwidth greater than the required bandwidth, as a communication bandwidth requested for execution of a specific process in the vehicle, based on at least one of a computing power or a sensing capability of the vehicle. In this case, the request unit may be configured to request the at least two types of the requested bandwidth including the required bandwidth and the desired bandwidth, to the communication management device, so as to secure the requested bandwidth. Furthermore, the defining unit defines the utilization bandwidth in accordance with the response in which the requested bandwidth is available to be secured from the at least two types of the requested bandwidth.

Hereinafter, a plurality of embodiments for carrying out the present disclosure will be described with reference to the drawings. In each embodiment, parts corresponding to an item described in the prior embodiment are denoted by the same reference numerals, and redundant description may be omitted. When only a part of the configuration is described in each embodiment, another embodiment described previously may be applied to the other parts of the configuration. Not only a combination of parts that are specifically indicated as combinable in each embodiment but also a partial combination of embodiments without being explicitly indicated is possible when no particular obstacle to the combination arises.

First Embodiment

Figure 2:
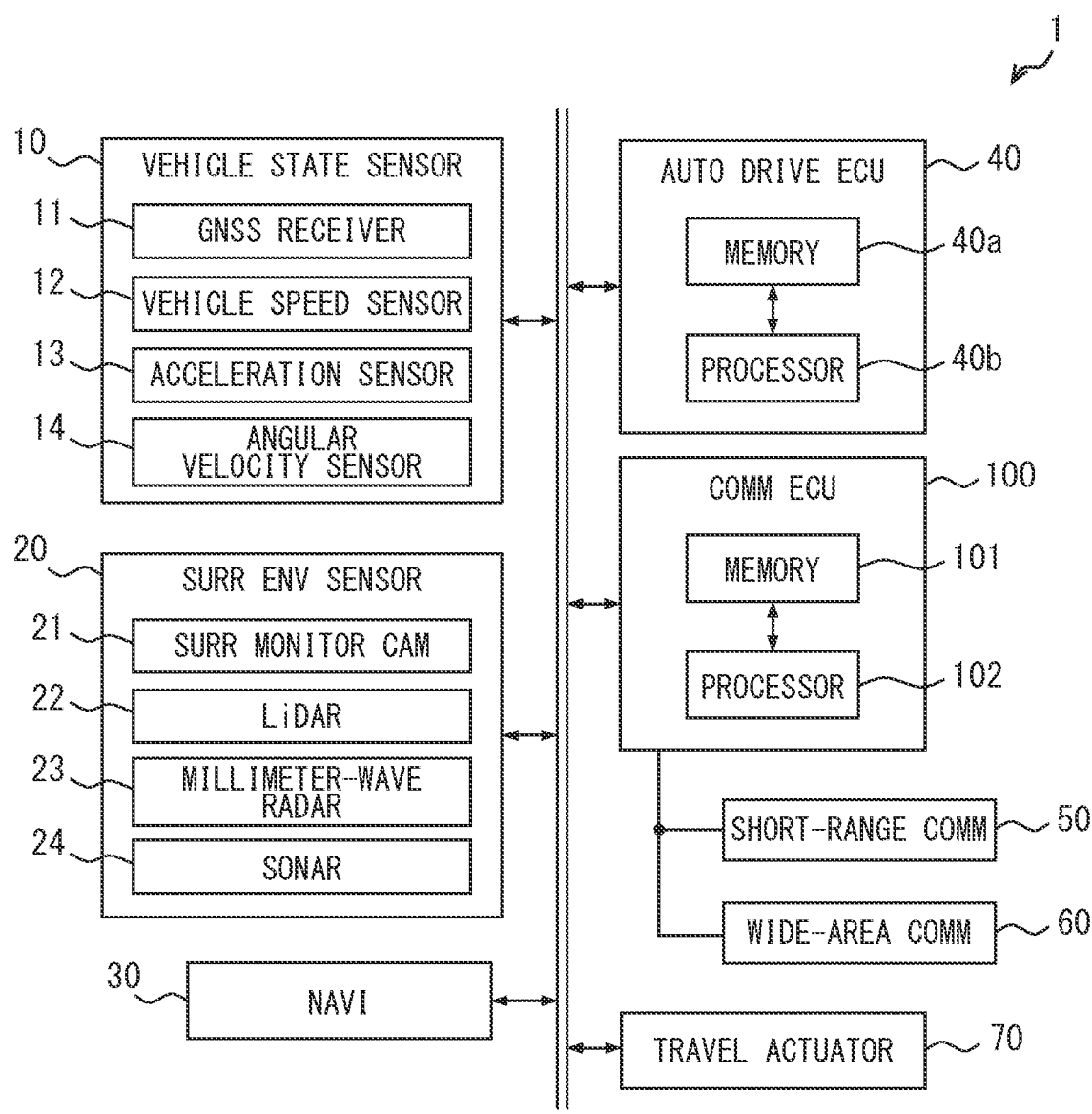
FIG. 2 is a diagram showing an entire vehicle system including a communication ECU.

An overall system including a communication ECU 100 of the first embodiment will be described with reference to FIGS. 1 to 8. The communication ECU 100 is an electronic control unit mounted on a vehicle A. The vehicle A can communicate with a center server 3 via a base station BS and a network NW. As shown in FIG. 2, the communication ECU 100 is connected to a vehicle state sensor 10, a surrounding environment sensor 20, a navigation device 30, an automatic drive ECU 40, a short-range communication device 50, a wide-area communication device 60 and a travel actuator 70 via a communication bus and the like.

The vehicle state sensor 10 is a sensor group for detecting various states of the vehicle A. The vehicle state sensor 10 includes a GNSS receiver 11, a vehicle speed sensor 12, an acceleration sensor 13, and an angular velocity sensor 14, for example. The GNSS receiver 11 detects a position of the vehicle A based on navigation signals from positioning satellites. The vehicle speed sensor 12 detects a speed of the vehicle A. The acceleration sensor 13 detects acceleration acting on the vehicle A. The angular velocity sensor 14 detects an angular velocity acting on the vehicle A.

The surrounding environment sensor 20 is a sensor group that detects various types of information about a surrounding environment of the vehicle A. The surrounding environment sensor 20 includes a surrounding monitor camera 21, a LiDAR (Light Detection and Ranging/Laser Imaging Detection and Ranging) 22, a millimeter-wave radar 23, and a sonar 24, for example. The surrounding monitor camera 21 captures an image of a predetermined range including a front field of the vehicle A. The LiDAR 22 emits a laser beam and detects a group of points, regarding feature points of a feature, by detecting reflected light of the laser beam reflected by the feature. The millimeter-wave radar 23 generates detection information of the surrounding environment by receiving reflected waves of emitted millimeter waves or quasi-millimeter waves. The sonar 24 generates detection information of the surrounding environment by receiving reflected ultrasonic waves.

The navigation device 30 is an in-vehicle device that provides route guidance to a destination set by a user. The navigation device 30 searches for multiple routes to a destination, to satisfy conditions such as time priority and distance priority. When one of the multiple searched routes is selected, the navigation device 30 provides the automatic drive ECU 40 with route information regarding a planned travel route.

The automatic drive ECU 40 and the communication ECU 100 each have a configuration mainly including a computer having memories 40a, 101, processors 40b, 102, input/output interfaces, buses connecting these, and the like. The processors 40b and 102 are hardware for arithmetic processing or computing. The processors 40b and 102 include at least one type of core among, for example, a CPU (Central Processing Unit), a GPU (Graphics Processing Unit), and a RISC (Reduced Instruction Set Computer)-CPU.

The memories 40a and 101 are at least one type of non-transitory, tangible storage medium storing computer-readable programs and/or data non-temporarily, such as, for example, a semiconductor memory, a magnetic medium, an optical medium, and the like. The memories 40a and 101 store various programs executable by corresponding processors 40b and 102, respectively. Specifically, the memory 40a stores a travel support program for supporting travel for the vehicle A. The memory 101 stores a communication control program for controlling communication between the vehicle A and the cloud and/or other vehicle(s).

The processors 40b, 102 execute a plurality of instructions stored in programs stored in the corresponding memories 40a, 101. Thereby, the automatic drive ECU 40 and the communication ECU 100 are configured to implement a plurality of functional units. The details of the functional units implemented by the respective ECUs 40 and 100 will be described later. The communication ECU 100 is an example of a "communication control device."

The short-range communication device 50 and the wide-area communication device 60 are communication modules mounted on the vehicle A. The short-range communication device 50 has a communication function in a relatively narrow range such as vehicle to roadside infrastructure (hereinafter "V2I") communication and vehicle to vehicle (hereinafter "V2V") communication. The wide-area communication device 60 has at least a function of V2N (Vehicle to cellular Network) communication in accordance with communication standards such as LTE (Long Term Evolution) and 5G, and communicates with the base station BS around the vehicle A, i.e., sends and receives radio waves therebetween. The wide-area communication device 60 is configured to enable cooperation between the cloud and the in-vehicle system (Cloud to Car) by V2N communication. By installing the wide-area communication device 60, the vehicle A becomes a connected car that can be connected to the Internet.

The travel actuator 70 is a travel control device group that controls travel of the vehicle A. The travel actuator 70 includes, for example, an electronically-controlled throttle, a brake actuator, and an EPS (Electric Power Steering) motor. Based on a control instruction from the automatic drive ECU 40, the travel actuator 70 performs autonomous travel or driving assistance in accordance with the control instruction. The travel actuator 70 may acquire the control instruction directly from the automatic drive ECU 40 or indirectly through another ECU.

Figure 3:
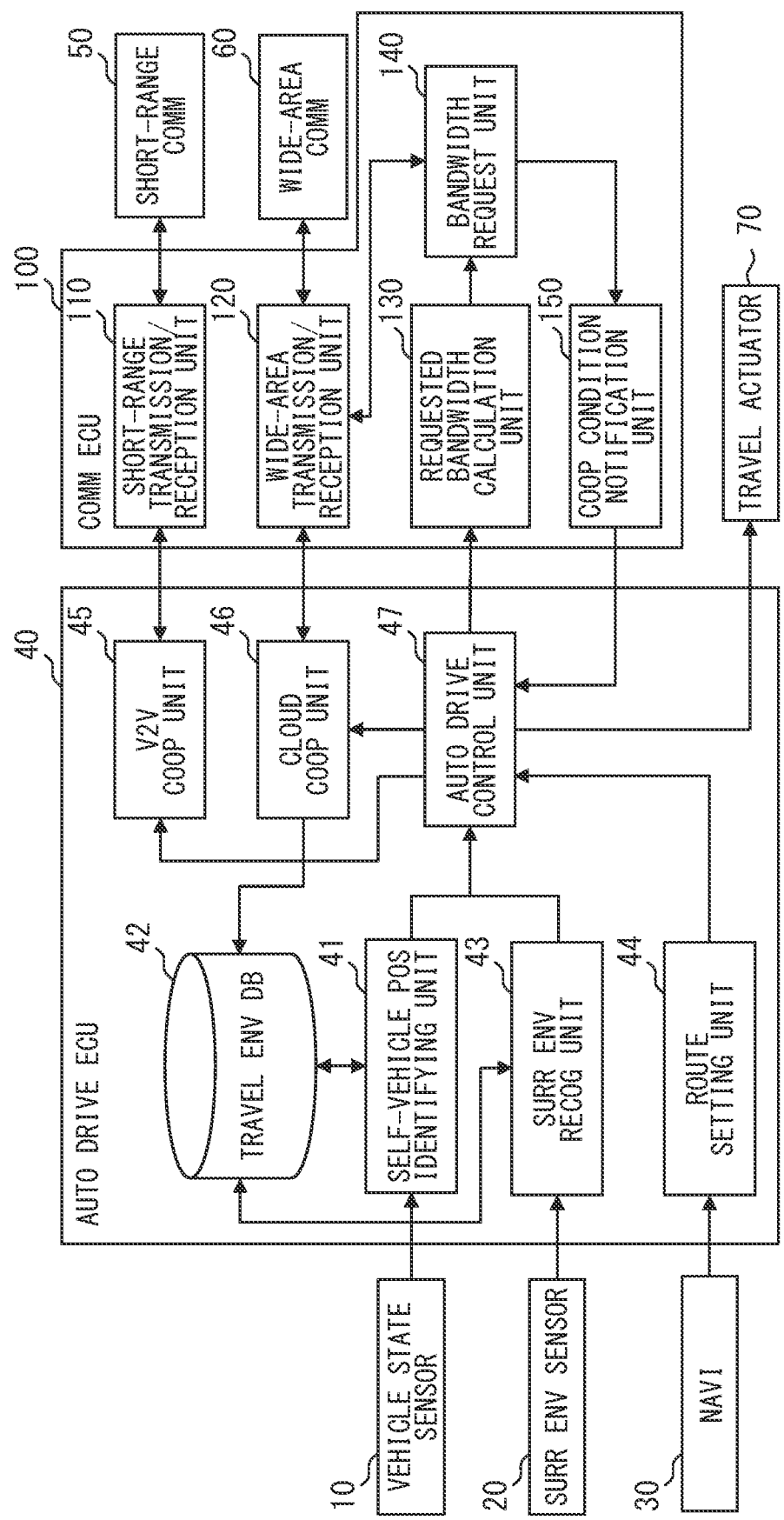
FIG. 3 is a block diagram showing an example of functions possessed by the communication ECU.

Next, details of the functional units implemented by the automatic drive ECU 40 and the communication ECU 100 will be described with reference to FIG. 3. The automatic drive ECU 40 is configured to implement a plurality of functional units for automatic drive control that partially or substantially-entirely controls a travel of the vehicle A. Specifically, the automatic drive ECU 40 includes a self-vehicle position identifying unit 41, a surrounding environment recognition unit 43, a route setting unit 44, a vehicle-to-vehicle cooperation unit 45, a cloud cooperation unit 46, and an automatic drive control unit 47 as functional units.

The self-vehicle position identifying unit 41 identifies a position of the vehicle A based on behavior information acquired from the vehicle state sensor 10 and map data acquired from a travel environment database (DB) 42 stored in a storage unit of a vehicle-mounted device.

The surrounding environment recognition unit 43 estimates a state of the surroundings of the vehicle A by using information on moving objects and feature information around the vehicle A acquired from the surrounding environment sensor 20 as well as surrounding environment information stored in the travel environment DB 42. The route setting unit 44 acquires route information about a planned travel route from the navigation device 30, and sets it as a route that the vehicle A follows in automatic driving.

Via the short-range communication device 50 and the communication ECU 100, the vehicle-to-vehicle cooperation unit 45 acquires data transmitted from other vehicles, and provides data to be transmitted to the other vehicles.

The cloud cooperation unit 46 acquires data transmitted from the cloud via the wide-area communication device 60 and the communication ECU 100. Specifically, the cloud cooperation unit 46 acquires travel environment information on the planned route from the center server 3. The travel environment information includes traffic information such as congestion, complexity of road structure, weather information, and regulation information involving accidents, events or the like.

The automatic drive control unit 47 recognizes surrounding environment of the vehicle A from the position of the vehicle, determines details of control, and generates a control instruction to be output to the travel actuator 70. In addition, the automatic drive control unit 47 determines whether or not a travel area of the vehicle A exceeds an ODD (operation design domain) based on the travel environment information. When it is determined that the ODD is exceeded in the travel area, the automatic drive control unit 47 determines that automatic driving is not possible, and shifts to different operation mode, such as handover of the travel control to the driver or stopping the vehicle A. When it is determined that the travel area is within the ODD, the automatic drive control unit 47 determines whether automatic drive control is continuable, without using communication. When it is determined that the travel area is within the ODD and the automatic operation control is continuable without communication, the automatic drive control unit 47 continues an automatic drive control process. When it is determined that the travel area is within the ODD and communication is required, the automatic drive control unit 47 generates a communication utilization request, and inquires the communication ECU 100 whether or not communication utilization is possible (i.e., sends a communication utilization inquiry to the communication ECU 100).

Figures 4, 5:
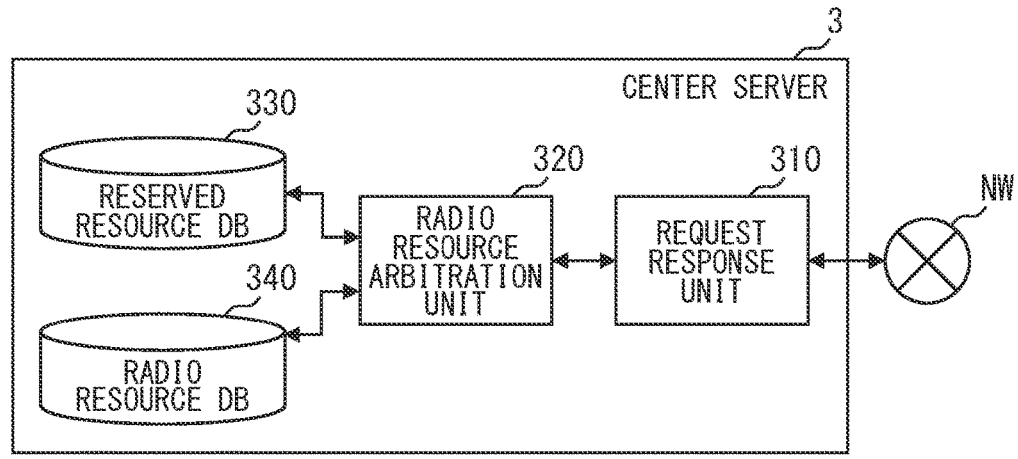
FIG. 4 is a block diagram showing an example of functions possessed by the center server.
FIG. 5 is a diagram showing an example of sensing capability of each of surrounding environment sensors.

The automatic drive control unit 47 calculates, as the communication utilization inquiry, a difference from the surrounding environment information required for a travel of the vehicle A along a predicted travel route while maintaining a level of an automatic drive requested by the user based on the performance of the sensor group and control software provided in the vehicle A. For example, in case that the vehicle A is equipped with only the surrounding monitor camera 21 as the surrounding environment sensor 20, as illustrated in the table of FIG. 5, deterioration of recognition performance of the camera 21 may be assumed in an adverse environment such as a night time, a backlight, a bad weather (e.g., dense fog or the like). Therefore, when it is determined that the vehicle A is traveling in such an environment, the automatic drive control unit 47 requests for acquisition of position information of surrounding moving bodies, and the like, as the communication utilization request. In the table of FIG. 5, the performance of the surrounding environment sensor 20 is shown (i.e., rated) as deteriorating from good to bad in an order of a circle mark (good), a triangle mark (not good), and a cross mark (bad) in respectively-denoted environments. Further, an asterisk in the table indicates that the performance evaluation in the denoted environment changes depending on a mounting position or the number of the surrounding environment sensors 20. Alternatively, the automatic drive control unit 47 may generate a communication utilization request based on the computing power of the automatic drive ECU 40.

In addition, the automatic drive control unit 47 generates multiple levels of communication utilization requests. For example, the automatic drive control unit 47 generates two levels of communication utilization requests, a desired level and a required level.

The automatic drive control unit 47 sets a cloud utilization condition that limits utilization of communication within a setting range, when receiving a response to the inquiry from the communication ECU 100.

Next, functional units constructed by the communication ECU 100 will be described. The communication ECU 100 constructs a plurality of functional units for communication control of the vehicle A. Specifically, the communication ECU 100 includes functional units such as a short-range transmission/reception unit 110, a wide-area transmission/reception unit 120, a requested bandwidth calculation unit 130, a bandwidth request unit 140, a cooperation condition notification unit 150, and the like. The short-range transmission/reception unit 110 communicates with the outside via the short-range communication device 50. The wide-area transmission/reception unit 120 communicates with the outside via the wide-area communication device 60.

The requested bandwidth calculation unit 130 calculates a requested bandwidth, which is a communication bandwidth that is requested to be secured for performing the automatic driving control in the vehicle A, based on at least one of the computing power or/and sensing capability of the vehicle A. For example, when the requested bandwidth calculation unit 130 acquires an inquiry of a communication utilization request generated by the automatic drive control unit 47 based on the sensing capability described above, the requested bandwidth calculation unit 130 calculates a communication bandwidth for accommodating the requested content, by confirming the content of the communication utilization request. At this time, the requested bandwidth calculation unit 130 calculates two bandwidths respectively as the requested bandwidth, i.e., a desired bandwidth corresponding to the desired level and a requested bandwidth corresponding to the required level. The automatic drive control is an example of a "specific process." Also, the requested bandwidth calculation unit 130 is an example of a "calculation unit."

The bandwidth request unit 140 transmits, as a communication bandwidth reservation request, information of the calculated requested bandwidth to the center server 3 via the wide-area transmission/reception unit 120. The bandwidth request unit 140 is an example of a "request unit."

The cooperation condition notification unit 150 defines a utilization bandwidth, which is a communication bandwidth to be used in the vehicle A, based on a response to the request to secure the requested bandwidth. Specifically, the cooperation condition notification unit 150 responds to the inquiry from the automatic drive control unit 47 upon receiving a response result from the center server 3 to the request. In the response, it is returned as a response content that the desired bandwidth is available, the required bandwidth is available, and the bandwidth is not secured. When a change notification is received from the center server 3 in response to a reservation request, the content of the change is notified to the automatic drive ECU 40. The cooperation condition notification unit 150 is an example of a "defining unit."

The center server 3 is a communication management device that manages communication bandwidths used by a plurality of vehicles A. Like the automatic drive ECU 40 and the communication ECU 100, the center server 3 mainly includes a computer having a memory 301, a processor 302, an input/output interface, and a bus connecting them. The memory 301 stores various programs such as a resource arbitration program executed by the processor 302.

The processor 302 executes instructions included in the programs stored in the memory 301. Thereby, the center server 3 constructs a plurality of functional units. Specifically, the center server 3 executes instructions included in the resource arbitration program, thereby constructing a request response unit 310 and a radio resource arbitration unit 320 as functional units, as shown in FIG. 4.

The request response unit 310 receives a communication bandwidth reservation request from the vehicle A, and transmits a response to the request.

The radio resource arbitration unit 320 manages a capacity of radio resources for each base station BS, and reserves resources in response to the communication bandwidth reservation request from the vehicle A. The radio resource arbitration unit 320 acquires from a radio resource DB 340 a capacity of radio resources in a base station BS area for which an inquiry has been made. In addition, the radio resource arbitration unit 320 acquires a current reservation status of radio resources from a reserved resource DB 330. The radio resource arbitration unit 320 predicts whether the requested bandwidth can be secured. The radio resource arbitration unit 320 responds to the request that the desired bandwidth is available when the requested radio resources are within the capacity and the requested bandwidth can be secured up to the desired bandwidth. Further, in case that the requested bandwidth is securable only up to the required bandwidth, the radio resource arbitration unit 320 responds to the request that the required bandwidth is available.

On the other hand, when the requested bandwidth exceeds the capacity, the radio resource arbitration unit 320 confirms whether reallocation of reserved resources is possible. The radio resource arbitration unit 320 determines whether to reallocate the radio resources already reserved as the desired bandwidth. That is, the radio resource arbitration unit 320 determines whether or not it is possible to secure the requested bandwidth, which is currently exceeds the capacity in the relevant base station BS area, by changing the radio resource that has been reserved as the amount of the desired bandwidth to the amount of the required bandwidth. When radio resources that are reallocatable can be secured, the radio resource arbitration unit 320 updates the reserved resources, and transmits the arbitration result indicating that the desired bandwidth is available or the required bandwidth is available. When the reallocation is not possible, the radio resource arbitration unit 320 transmits the arbitration result indicating that the bandwidth is not secured. When the reserved resource BD is updated for reallocation, the radio resource arbitration unit 320 notifies the target vehicle of the change notification.

Figure 6:
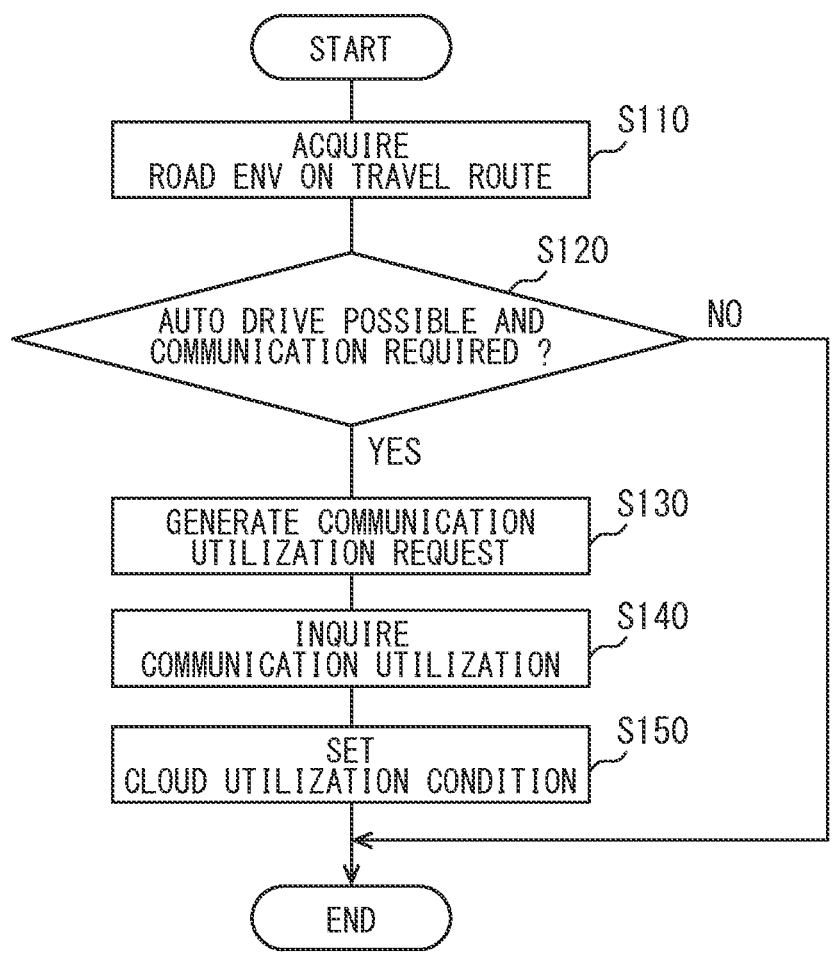
FIG. 6 is a flowchart showing an example of a communication request generation method performed by an automatic drive ECU.
Figure 7:
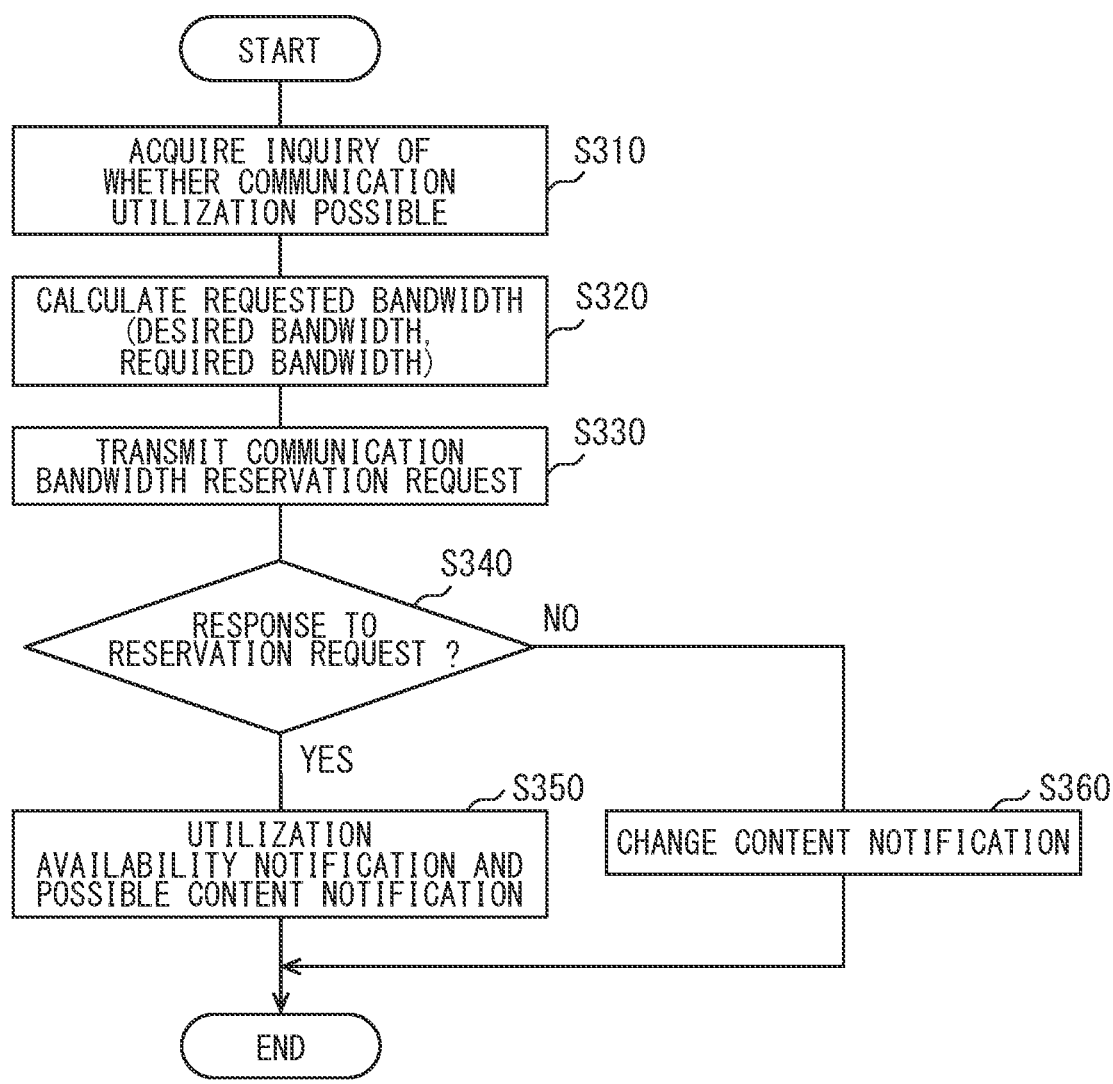
FIG. 7 is a flowchart showing an example of a communication control method performed by the communication ECU.
Figure 8:
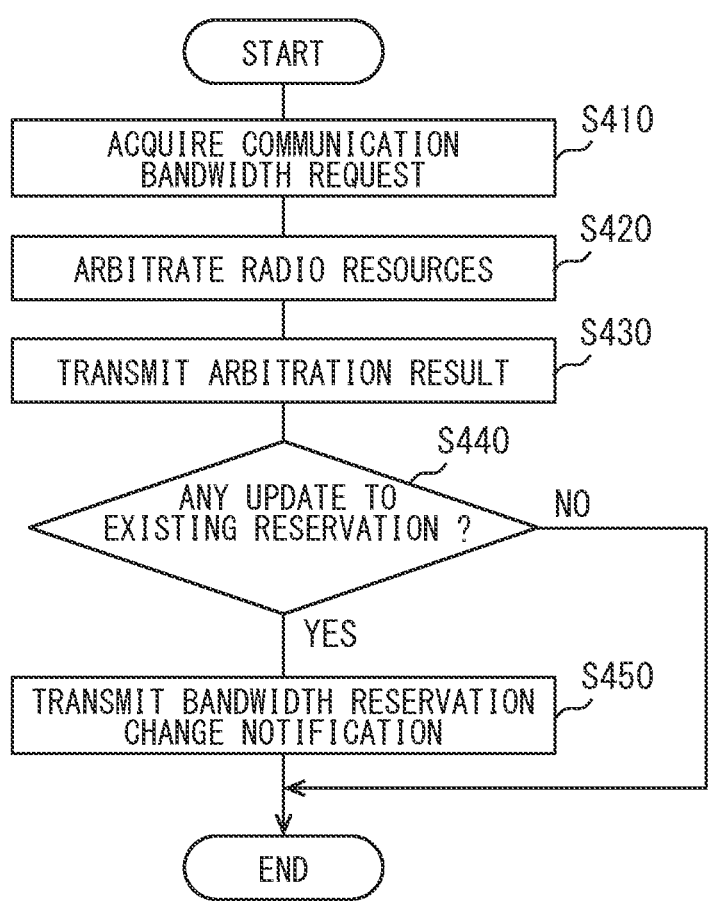
FIG. 8 is a flowchart showing an example of a resource arbitration method performed by the center server.

Next, a flow of each of the methods performed by the automatic drive ECU 40, the communication ECU 100 and the center server 3 in cooperation with the functional blocks will be described below with reference to FIGS. 6 to 8. In a flow chart described below, "S" means multiple steps of the flow to be performed by multiple instructions included in a program.

First, a communication request generation method performed by the automatic drive ECU 40 will be described with reference to FIG. 6.

In S110, the cloud cooperation unit 46 acquires a road environment on the predicted travel route from the center server 3. The road environment includes traffic information such as congestion, complexity of road structure, weather information, and regulation information such as accidents and events. Next, in S120, the automatic drive control unit 47 determines whether automatic driving is possible and whether communication is required to continue automatic driving. If it is determined that the automatic driving is impossible or the communication is not required to continue the automatic driving, the automatic drive control unit 47 ends the series of processing because there is no need for the communication utilization request.

On the other hand, when it is determined in S120 that automatic driving is possible and communication is required to continue automatic driving, the automatic drive control unit 47 generates a communication utilization request in S130. In subsequent S140, the automatic drive control unit 47 transmits a communication utilization request to the communication ECU 100, thereby inquiring whether or not communication is required.

Then, in S150, the automatic drive control unit 47 sets the cloud utilization condition based on the response of the communication ECU 100 to the inquiry in S140. Thereby, the automatic drive control unit 47 limits communication utilization within the setting range.

Next, a communication control method performed by the communication ECU 100 will be described with reference to FIG. 7.

First, in S310, the requested bandwidth calculation unit 130 acquires an inquiry of whether the communication utilization is possible from the automatic drive ECU 40. Next, in S320, the requested bandwidth calculation unit 130 calculates two levels of requested bandwidth, that is, the desired bandwidth and the required bandwidth, based on the acquired inquiry content. Subsequently, in S330, the bandwidth request unit 140 transmits a communication bandwidth reservation request based on the requested bandwidth to the center server 3 via the wide-area transmission/reception unit 120.

Then, in S340, the bandwidth request unit 140 acquires the response result from the center server 3 with respect to the communication bandwidth reservation request, and determines the content of the response result. Specifically, in S340, it is determined whether the response result is a response to the communication bandwidth reservation request or a response notifying a change of a reservation request.

When it is determined that the response result is acquired as a response to the communication bandwidth reservation request, in S350, the cooperation condition notification unit 150 transmits, to the automatic drive ECU 40, a notification that utilization of communication is possible (i.e., utilization availability notification) and a notification of available requested bandwidth among the two levels (i.e., possible content notification).

On the other hand, if it is determined in S340 that the response result is acquired as a notification of the change of the reserved bandwidth, in S360, a notification regarding the content of the change (i.e., change content notification) is transmitted to the automatic drive ECU 40.

Next, a resource arbitration method performed by the center server 3 will be described with reference to FIG. 8. First, in S410, the request response unit 310 acquires a communication bandwidth request. Next, in S420, the radio resource arbitration unit 320 predicts whether or not the requested bandwidth included in the communication bandwidth request can be secured, and arbitrates the communication resource. Then, in S430, request response unit 310 transmits an arbitration result to the communication ECU 100 of the vehicle A as a response result to the communication bandwidth request.

Subsequently, in S440, the radio resource arbitration unit 320 determines whether or not an existing reservation has been updated by the resource arbitration in S420. If it is determined that the existing reservation has been updated, then in S450, a bandwidth reservation change notification is transmitted to a vehicle corresponding to the updated existing reservation, and the series of processing ends. On the other hand, if it is determined in S440 that the existing reservation has not been updated, the process of S450 is skipped and the series of processing ends.

Note that S320 described above is an example of a "calculation process," S330 is an example of a "request process," and S350 is an example of a "defining process."

According to the first embodiment described above, the requested bandwidth, which is a communication bandwidth requested for performing the specific process in the vehicle A, is calculated based on at least one of the computing power and the sensing capability of the vehicle A, and a request is transmitted to the center server 3 to secure the requested bandwidth. Then, based on the response to the request to secure the requested bandwidth, the utilization bandwidth, which is the communication bandwidth used by the vehicle A, is defined. Therefore, according to the capability of each of the vehicles, the utilization bandwidth can be appropriately allocated. As a result, congestion can be suppressed in communication between the vehicle and the outside.

Further, according to the first embodiment, at least two types of bandwidth, i.e., the required bandwidth required for the specific process and the desired bandwidth greater than the required bandwidth, can be calculated as the requested bandwidth. Therefore, according to the communication utilization request from a plurality of vehicles A, utilization bandwidths can be more appropriately allocated.

In addition, according to the first embodiment, the defined utilization bandwidth is changed based on information on the change regarding the requested bandwidth already reserved by the center server 3. Therefore, communication control that easily responds to communication utilization requests from other vehicles A can be realized.

Furthermore, according to the first embodiment, the requested bandwidth is calculated based on the difference between (i) the surrounding environment information required for the continuous processing of the autonomous travel of the vehicle A and (ii) the surrounding environment information acquired by the surrounding environment sensor 20 mounted on the vehicle A. Therefore, a communication bandwidth that enables continuation of autonomous travel can be more reliably secured. Thus, interruption of autonomous travel due to lack of information is avoidable.

Other Embodiments

The disclosure in the present description is not limited to the above-described embodiments. The present disclosure includes embodiments described above and modifications of the above-described embodiments made by a person skilled in the art. For example, the present disclosure is not limited to a combination of the components and/or elements described in the embodiments. The present disclosure may be realized by various different combinations. The present disclosure may include additional configuration that can be added to the above-described embodiments. The present disclosure also includes modifications of the embodiments from which a component and/or an element is omitted. The present disclosure includes replacements of components and/or elements between one embodiment and another embodiment, or combinations of components and/or elements between one embodiment and another embodiment. The disclosed technical scope is not limited to the description of the embodiments. It should be understood that some disclosed technical ranges are indicated by description of claims, and includes every modification within the equivalent meaning and the scope of description of claims.

In the above-described embodiment, the requested bandwidth calculation unit 130 calculates the request bandwidth, which is a communication bandwidth requested for the execution of automatic drive control. However, the request bandwidth may also be calculated for execution of processing other than the automatic drive control. For example, the requested bandwidth calculation unit 130 may calculate a requested bandwidth for executing display processing of video content on an in-vehicle display.

The communication ECU 100 may be a dedicated computer including at least one of a digital circuit and an analog circuit as a processor. In particular, the digital circuit is at least one type of, for example, an ASIC (Application Specific Integrated Circuit), an FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The communication ECU 100 may be provided by a single computer or by a set of computer resources linked by a data communications device. For example, some of the functions provided by the communication ECU 100 in the above-described embodiments may be realized by another ECU.

What is claimed is:

1. A communication control device in a vehicle for controlling communication between the vehicle and a communication management device outside the vehicle, the communication control device comprising a processor configured to cause the communication control device to:
- calculate at least two types of requested bandwidth including a required bandwidth required for execution of a specific process in the vehicle and a desired bandwidth greater than the required bandwidth, as a communication bandwidth requested for execution of a specific process in the vehicle, based on a sensing capability of the vehicle;
- request the communication management device to secure the requested bandwidth; and
- define a utilization bandwidth from the at least two types of the requested bandwidth, which is the communication bandwidth used by the vehicle, based on a response to a request for securing the requested bandwidth;

wherein the processor is configured to:
- calculate the requested bandwidth based on a difference between required surrounding environment information that is required for continuous processing of an autonomous travel of the vehicle and acquired surrounding environment information that is acquired by a sensor mounted on the vehicle, the required surrounding environment information corresponding to a relationship between a type of the sensor and a traveling environment of the vehicle; and
- define the utilization bandwidth in accordance with the response in which the requested bandwidth is available to be secured from the at least two types of the requested bandwidth.

2. The communication control device according to claim 1, wherein
the processor is further configured to acquire change information relating to a change in the requested bandwidth secured by the communication management device, and to change the defined utilization bandwidth based on the change information.

3. The communication control device according to claim 1, wherein the processor is configured to calculate the requested bandwidth based on the sensing capability and a computing power of the vehicle.

4. The communication control device according to claim 1, wherein the processor is further configured to:
- obtain a communication utilization request that is determined based on the difference between the required surrounding environment, which is determined from the relationship between the type of the sensor and the traveling environment of the vehicle, and the acquired surrounding information; and
- calculate the requested bandwidth based on the communication utilization request.

5. A communication control method performed by a processor in a vehicle for controlling communication between the vehicle and a communication management device outside the vehicle, the communication control method comprising:
- calculating at least two types of requested bandwidth including a required bandwidth required for execution of a specific process in the vehicle and a desired bandwidth greater than the required bandwidth, as a communication bandwidth requested for execution of a specific process in the vehicle, based on a sensing capability of the vehicle;
- requesting the communication management device to secure the requested bandwidth; and
- defining a utilization bandwidth from the at least two types of the requested bandwidth, which is the communication bandwidth used by the vehicle, based on a response to a request for securing the requested bandwidth, wherein
- in the calculating, the requested bandwidth is calculated based on a difference between required surrounding environment information that is required for continuous processing of an autonomous travel of the vehicle, and acquired surrounding environment information that is acquired by a sensor mounted on the vehicle, the required surrounding environment information corresponding to a relationship between a type of the sensor and a traveling environment of the vehicle, and
- in the defining, the utilization bandwidth is defined in accordance with the response in which the requested bandwidth is available to be secured from the at least two types of the requested bandwidth.

6. A non-transitory computer readable medium storing a communication control program including instructions configured to, when executed by a processor in a vehicle, cause the processor to:
- calculate at least two types of requested bandwidth including a required bandwidth required for execution of a specific process in the vehicle and a desired bandwidth greater than the required bandwidth, as a communication bandwidth requested for execution of a specific process in the vehicle, based on a sensing capability of the vehicle;
- request a communication management device outside the vehicle to secure the requested bandwidth; and
- define a utilization bandwidth from the at least two types of the requested bandwidth, which is the communication bandwidth used by the vehicle, based on a response to a request for securing the requested bandwidth, wherein
- the requested bandwidth is calculated based on a difference between required surrounding environment information that is required for continuous processing of an autonomous travel of the vehicle, and acquired surrounding environment information that is acquired by a sensor mounted on the vehicle, the required surrounding environment information corresponding to a relationship between a type of the sensor and a traveling environment of the vehicle, and
- the utilization bandwidth is defined in accordance with the response in which the requested bandwidth is available to be secured from the at least two types of the requested bandwidth.

* * * * *